Dec. 12, 1967 P. MLYNAR ETAL 3,358,156

PLURALITY OF REVERSE SWITCHING RECTIFIERS AND A REVERSE ENERGY DISSIPATION CIRCUIT COMBINATION IN A LINE PULSING MODULATOR

Filed March 12, 1965

WITNESSES:

Bernard R. Giegue

James F. Young

INVENTORS

Peter Mlynar and

David A. Battistella.

BY Ernest P. Klipfel

ATTORNEY

United States Patent Office 3,358,156

Patented Dec. 12, 1967

3,358,156

PLURALITY OF REVERSE SWITCHING RECTIFIERS AND A REVERSE ENERGY DISSIPATION CIRCUIT COMBINATION IN A LINE PULSING MODULATOR

Peter Mlynar, Monroeville, and David A. Battistella, Swissvale, Pa., assignors to Westinghouse Electric Corporation, Pittsburgh, Pa., a corporation of Pennsylvania Filed Mar. 12, 1965, Ser. No. 439,162
3 Claims. (Cl. 307—88.5)

ABSTRACT OF THE DISCLOSURE

In a line pulsing modulator, a plurality of reverse switching rectifiers and a reverse energy dissipation circuit are connected across a pulse forming network. The switching devices will block discharge of the network unless rendered conductive when triggered by the firing of some of the devices. When rendered conductive the switching devices allow fast discharge of energy through the load. Should mismatch occur the resulting energy reversal will flow through the switching devices in a direction to be readily dissipated by a discharge impedance.

Figure 1:
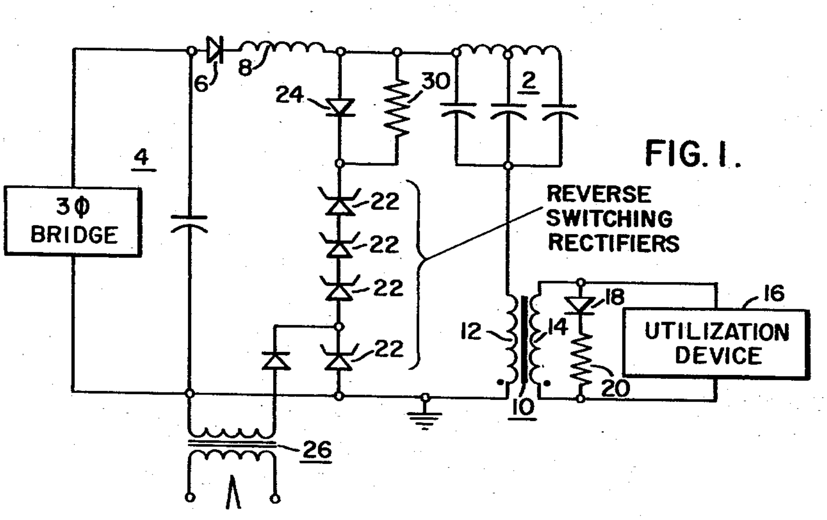

The present invention relates generally to line pulsing modulators and more particularly relates to a line pulsing moduator of high pulsing frequency.

Line pulsing modulators, such as radar modulators, provide for discharging a pulse forming network through a load by means of a switch. When the switch is of the unidirectional type, such as a silicon controlled rectifier, the necessary current limiting reactor required to protect the rectifier limits the rate of rise of the pulse output from the modulator. If the switch is a tube, the deionization time delays firing the next pulse. When the switch is bidirectional, such as a spark gap, contaminates or humidity and pressure variations can cause erratic firing and spurious signals. Further, during energy reversals the efficiency of energy dissipation is limited by the gap becoming deionized before all the energy stored in the pulse forming network can be dissipated. Many reflections may be needed for dissipation, introducing unnecessary time delays.

An object of the present invention is to provide a line pulsing modulator capable of a pulsing frequency heretofore unattainable.

Another object of the present invention is to provide a line pulsing modulator combining many of the advantages of a unidirectional and bidirectional switch with few of their disadvantages.

Another object of the present invention is to provide a line pulsing modulator which effectively dissipates energy reversal due to mismatch of the driven load.

Briefly, the present invention accomplishes advantages and the above-cited objects by providing in a line pulsing modulator, a plurality of semiconductor switching devices and a reverse energy dissipation circuit connected in combination across a pulse forming network which stores energy and forms pulses. The switching devices will block discharge of the pulse forming network through a load unless rendered conductive by a triggering signal. When rendered conductive the switching devices allow fast discharge of energy through the load. Should some mismatch occur with the load due to, for example, misfiring of a klystron or magnetron, the resulting energy reversal will readily flow through the semiconductor switching devices in a direction to be dissipated by a discharge impedance. The discharge impedance is bypassed by a unilateral conduction device during the discharge cycle forming the output pulse.

Figure 2:
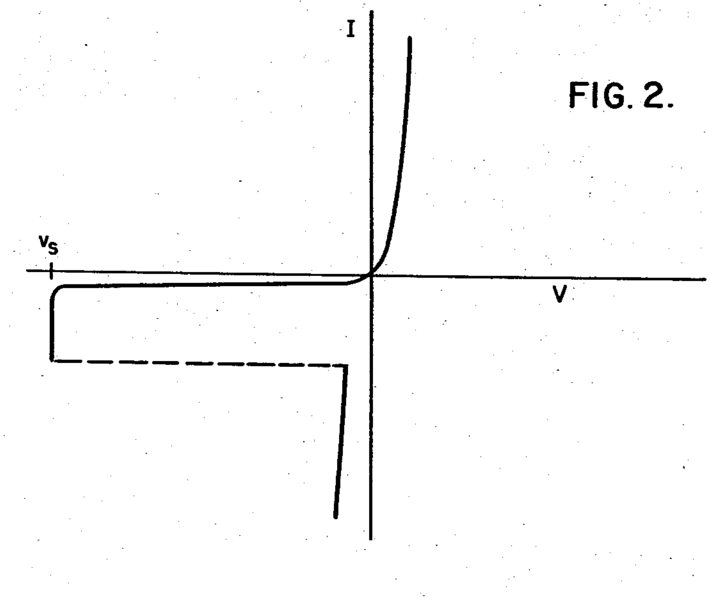

Further objects and advantages of the present invention will be readily apparent from the following detailed description taken in conjunction with the drawing in which:

FIGURE 1 is an electrical schematic diagram of an illustrative embodiment of the present invention; and FIG. 2 is a characteristic operating curve of a device utilized in the illustrative embodiment of FIG. 1.

A line pulsing modulator, such as for use in a radar modulator for pulsing a magnetron or klystron, is illustrated in FIG. 1. A pulse forming network 2 is connected to be charged to a voltage of a predetermined magnitude by a DC voltage supply 4 through a diode 6 and charging coil 8. A load 10 including a pulse transformer having a primary winding 12 and secondary winding 14 is connected to receive energy from said pulse forming network 2. More particularly, the primary winding 12 connects the pulse forming network 2 to a point of reference or ground potential and the secondary winding 14 connects a utilization device 16 to the modulator. A diode 18 and resistive element 20 limit any backswing in the pulse provided to the utilization device 16. As mentioned previously, the utilization device 16 may be any suitable device such as a klystron or magnetron.

A plurality of semiconductor switching devices 22 and a diode 24 are connected in series circuit combination across the pulse forming network 2 and and primary winding 12. The voltage-current characteristic curve of the semiconductor switching device 22 is illustrated in FIG. 2. The device is conductive in one direction as indicated by the first quadrant or forward direction but is conductive in the other or reverse direction only after an avalanche or triggering voltage level is exceeded whereupon the device is conductive in the reverse direction with only a small sustaining current. More particularly, the semiconductor switching device 22 is conductive in the forward direction and has a predetermined switching voltage level $V_S$ which, when exceeded, will render the device conductive in the other or reverse direction. One such device is the four-layer semiconductor diode more fully described in a publication entitled, "Two-Terminal Asymmetrical and Symmetrical Silicon Negative Resistance Switches," by R. W. Aldrich and N. Holonyak, Jr., in the Journal of Applied Physics, volume 30, number 11, dated November 1959. Of course, any suitable device exhibiting a voltage-current characteristic curve as illustrated in FIG. 2 may be utilized.

In operation, and after the pulse forming network 2 has been charged to a voltage of predetermined magnitude, the network 2 will be blocked by the combination of semiconductor switching devices 22. The number of devices 22 that is employed is readily determined by adding the switching voltage level of each device so that the sum of their switching voltage levels will exceed the voltage on the pulse forming network. A trigger pulse applied to at least one of the switching devices 22 through a pulse transformer 26, when added to the portion of the voltage appearing thereacross from the network 2, exceeds the switching voltage level of the device 22 thereby rendering it conductive. As a result the remaining devices 22 find a voltage thereacross from the network 2 which exceeds their individual voltage switching levels causing them also to be rendered conductive. The triggering pulse is of sufficient duration to cause breakover of the semiconductor switching device connected to receive the pulse. The device which is conductive will remain so for the duration of the pulse. The duration of the pulse is selected to be of sufficient time duration to allow breakover of the remaining devices 22.

Upon all of the semiconductor switching devices 22 being rendered conductive, energy is discharged therethrough as well as through the diode 24 thereby providing a pulse to the load 16 through the pulsing transformer 10.

Should the load become mismatched with the network 2, such as for example by misfire of the magnetron or klystron, energy reversal could occur in the pulse forming network 2 which must be readily and efficiently dissipated by the modulator. The semiconductor switching devices 22 are poled to allow conduction in their forward direction thereby dissipating such energy in an impedance element illustrated as a resistor 30. The resistor 30 is connected across the diode 24 and is bypassed by the diode when the pulse forming network 2 is discharging. Energy in the reverse direction, however, will be directed to the energy dissipation element 30 since the diode 24 is poled to block current flowing through the semiconductor switching elements 22 in the forward direction. The magnitude of the impedance of the dissipated element 30 is chosen to be substantially equal to the magnitude of impedance of the utilization device 16 as seen by the primary winding 12.

Hence, it is readily apparent that the present invention provides a line pulsing modulator combining the advantages of a unidirectional and bidirectional switch. During the discharge half-cycle, substantially all of the energy is fed to the pulse transformer 10. During any faulty energy reversal, the energy resulting from mismatch will be readily dissipated in the resistor 30.

While the present invention has been described with a degree of particularity for the purpose of illustration, it is to be understood that all modifications, alterations, and substitutions within the spirit and scope of the present invention are herein meant to be included. For example, while a single semiconductor switching device is connected to be triggered to its conducting state, it is to be understood that any number of the devices may be connected to exceed their voltage switching level by triggering means. The charging voltage on the pulse forming network 2 may alone be used to render the semiconductor switching devices conductive when that voltage exceeds the sum of the switching voltage levels of the plurality of series connected devices 22.

We claim as our invention:

1. In a line pulsing modulator, the combination comprising; a pulse forming network and a load connected in a first circuit combination; means for charging said pulse forming network to a voltage of predetermined magnitude; a plurality of semiconductor switching devices each being conductive in one direction and each having a predetermined switching voltage level which when exceeded will render each said device conductive in the other direction; a unilateral conduction means and an impedance means connected in parallel circuit combination; said parallel circuit combination and said plurality of semiconductor switching devices connected in series circuit combination across said first circuit combination; said semiconductor switching devices poled to block a discharge of said pulse forming network when the sum of their switching voltage levels exceeds said voltage of predetermined magnitude; means for exceeding the switching voltage level of at least one of said semiconductor switching devices to reduce the sum of the switching voltage levels of the remaining semiconductor switching devices to be less than said voltage of predetermined magnitude whereby all said semiconductor switching devices are rendered conductive in said other direction; said unilateral conducting means poled to block current in one direction and to allow current therethrough in said other direction; said impedance means dissipating energy flowing through said semiconductor switching devices in said one direction due to any mismatch of the load with said pulse forming network.

2. The line type pulser of claim 1 wherein said impedance means is a resistive element having a magnitude of impedance substantially equal to the impedance of said load.

3. The line type modulator of claim 1 wherein said unilateral conducting means is a rectifier poled to bypass said impedance means when said plurality of semiconductor switching devices are conductive in said other direction and direct energy into said impedance means when said plurality of semiconductor switching devices are conductive in said first direction.

References Cited

UNITED STATES PATENTS

| | | | |
|---|---|---|---|
| 2,962,607 | 11/1960 | Bright | 307—88.5 |
| 3,071,698 | 1/1963 | Thompson et al. | 307—88.5 |

OTHER REFERENCES

Pub. I "Four-Layer Diode Pulse Modulators" in Solid State Design dated July 1962, pp. 53–55.

"Introduction to The Shockley 4-Layer Diode" by Shockley Transistor (Clevite Corp.) C–1, March 1961, 6 pages.

ARTHUR GAUSS, *Primary Examiner.*

S. D. MILLER, *Assistant Examiner.*